March 8, 1966    O. F. ECKLUND ETAL    3,239,402
EDGE BANDING METHOD AND APPARATUS
Filed July 23, 1962
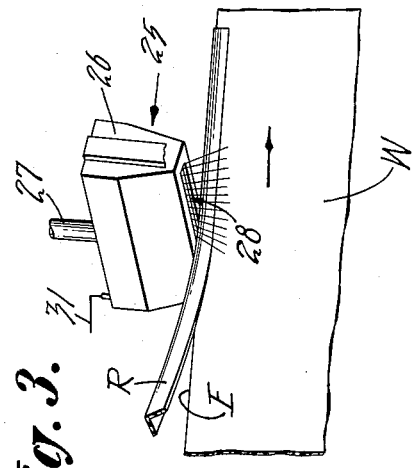
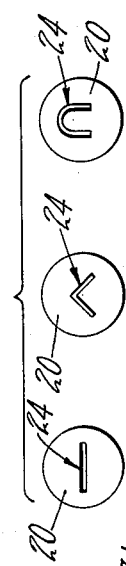
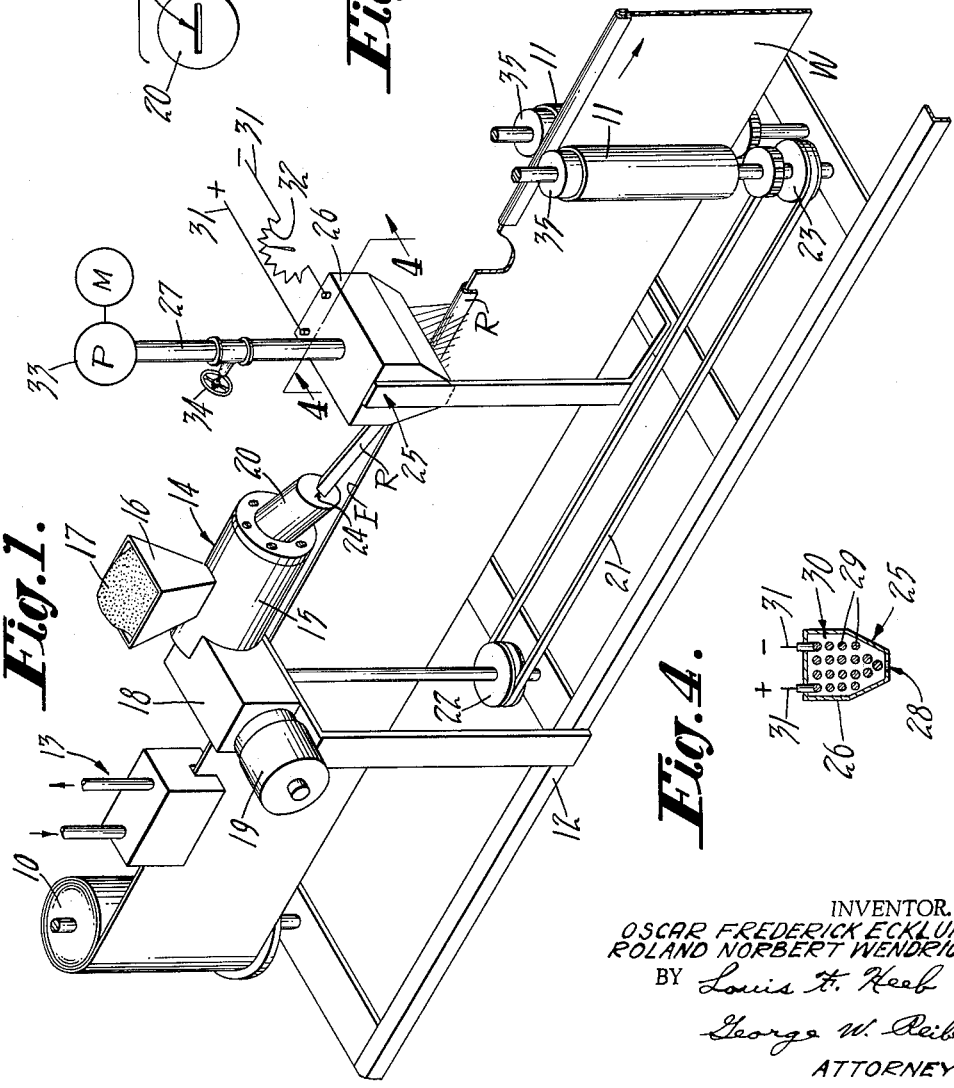
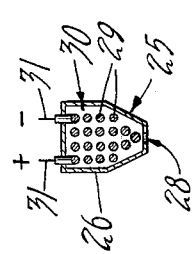
INVENTOR.
OSCAR FREDERICK ECKLUND
ROLAND NORBERT WENDRICKS
BY Louis H. Heeb
George W. Reiber
ATTORNEYS

United States Patent Office
3,239,402
Patented Mar. 8, 1966

3,239,402
EDGE BANDING METHOD AND APPARATUS
Oscar Frederick Ecklund, Tower Lakes, Barrington, and Roland Norbert Wendricks, Barrington, Ill., assignors to American Can Company, New York, N.Y., a corporation of New Jersey
Filed July 23, 1962, Ser. No. 211,511
12 Claims. (Cl. 156—200)

This invention relates to banding a marginal edge of generally flat or two-dimensional articles, including continuous strips, blanks, and the like, and more particularly to a method of and apparatus for applying a thermoplastic ribbon to at least one marginal edge of a continuous moving strip.

Many techniques have been devised for applying a folded-over tape or band to one or more of the marginal edges of flat articles. Such tapes ordinarily are of hot melt or pressure sensitive adhesive materials, and are commonly used as closure elements for bags, reinforcing strips for envelopes, prints, etc. and as protective covering for those flat articles and strips having raw cut edges.

This latter use has special significance in the packaging industry in view of the ever present problem of providing a packaging material resistant in all respects to various forms of moisture or corrosive attack. The manufacture of cartons from paper or fibre stock is an important example of this problem, where protection of the raw edges of the stock against moisture attack or "wicking" is less easily achieved than protecting the major surfaces of the stock with a barrier film by laminating or other conventional coating practices. A related consideration is the fact that one or more edges of a preformed blank or strip frequently forms part of the seams of a completed container. In such cases, the edge tape, in addition to providing raw edge protection, also may constitute the adhesive seal securing the seam. The dual role aggravates the problem and has considerable bearing on the selection of an optimum technique of edge taping.

Hot melt materials, such as thermoplastic resins, possess attractive qualitites for edge plating in that they are good sealants, and cohere with most substrate materials used in packaging manufacture. Tapes formed from these materials may be applied in several ways, known examples being to either (1) first fold a resinous or resin coated tape, in a flexible but unheated state, over the edge to be banded and then apply heat to soften the tape to an adhesive state, or (2) extrude the resin tape directly onto the edge to be banded, followed by application of pressure to effect a bond. The latter technique has the advantages of speed and simplicity, but in either case, the nature of the tape and the condition of the edge receiving the tape must be considered. A major factor is that a raw cut edge, whether resulting from a slitting, stamping or punching operation is rarely smooth and uniform but invariably has the appearance of a rough, jagged, and irregular surface when subjected to close inspection. To achieve good adhesion of a thin resinous tape to the cut edge without rupturing and without encountering a gap or "pipe" between the tape and edge or voids and wrinkles in the adhering tape is a problem of major proportions, particularly at high speeds and with very thin tapes essential to economical manufacture. In the main, known prior art techniques have either ignored this basic problem or represent solutions less satisfactory than desired.

An important object, therefore, of the instant invention is to overcome the difficulties of edge banding raw cut edges of flat articles.

Another object of this invention is to provide an improved method of applying a protective thermoplastic tape to the exposed raw edges of flat articles.

Another object of this invention is to provide an improved method of continuously extruding a protective tape onto the exposed marginal edge of a substrate web.

A further object of this invention is the provision of apparatus of improved construction and operation for simply and efficiently banding the marginal edges of flat articles.

Still another object of this invention is the provision of apparatus operative to apply an extruded thermoplastic tape to a raw cut edge of a continuously moving web without encountering damage to the tape or impairment of the resulting band.

Numerous other objects and advantages of the invention will be apparent as it is better understood from the following description, which, taken in connection with the accompanying drawings, discloses a preferred embodiment thereof.

To the accomplishment of these objects, there is provided a method of and apparatus for feeding a flat article, in the form of a continuous strip or otherwise, along a linear path of travel, extruding a continuous ribbon of semi-molten thermoplastic resin in the direction of feed and in an intersecting path toward a marginal edge of the article to be banded, applying a gentle fluid pressure against the ribbon and toward the edge to frictionally conform the ribbon about the edge, and thereafter applying roll pressure to the ribbon on opposite sides of the article to firmly bond the ribbon thereto.

Referring to the drawings:

FIG. 1 is a schematic perspective view of a preferred or exemplary form of the invention;

FIG. 2 is a view showing various extruder die orifice configurations which may be used to carry out the invention;

FIG. 3 is a fragmentary perspective view of the edge protection applying means; and FIG. 4 is a sectional view taken substantially along line 4—4 of FIG. 1.

A preferred or exemplary arrangement of apparatus for carrying out the present invention is illustrated in FIG. 1. A web W of a selected material having an exposed raw cut edge E to be bonded is fed from a pay-off roll 10 by a pair of pinch rolls 11, 11 along a linear path of travel through a series of stations. Rolls 10 and 11, 11 may be journaled in a suitable supporting member, such as frame 12, at remote positions defining the path of travel. Web W, although preferably fibre, may be one of a variety of other materials ordinarily used in the manufacture of container or other packaging forms, such as thin metal plate, foil, various laminates, etc. where raw cut edges constitute a problem. Although illustrated as but not limited to a continuous strip, the object to be banded may be preformed flat blanks such as container preforms or collapsed bags, fed in spaced processional order along a path of travel.

In many instances it is desirable to preheat the web W along the marginal edge to be banded. This is particularly so where the web is fibre and has a protective coating previously applied thereto, for two reasons. First, preheating promotes better adhesion to the marginal edge E and to the protective coating and, second, helps to drive out trapped air and moisture ordinarily present in the stock, thereby reducing the tendency of bubble or blister formation under the edge tape. This may be accomplished in any desired manner, an example being by means of a shrouded heater unit generally designated 13 overlying the edge of the web W at the first station adjacent pay-off roll 10. Heater 13 may comprise simply an enclosed chamber connected with appropriate inlet and exhaust conduit through which a heated medium circulates. Alternately, it may comprise an enclosed resistance coil or bank of lamps, the exact form being determined largely by the nature of the particular job.

Constituting the next succeeding station along the path of travel of web W is an extruder generally designated 14 which is affixed to frame 12 and comprises the conventional elements of a barrel 15, a hopper 16 for receiving a supply of pulverized or granular solid particles of a selected thermoplastic resin 17, a drive 18 for actuating a worm (not shown) within the barrel, a drive motor 19, and a die 20. Preferably, extruder drive 18 and pinch rolls 11, 11 have synchronized speeds for reasons to be hereinafter explained, which may be accomplished by an endless belt 21 running on pulleys 22 and 23 mounted to the extruder drive and pinch rolls, respectively.

Die 20 is mounted to the end of the extruder barrel 15 contiguous to and slightly inclined toward the edge E to be banded, and is provided with an orifice 24 from which the resin is forced in the form of a semi-molten ribbon R in an intersecting path toward edge E. As shown in FIG. 2, die orifice 24 may be one of several configurations, ranging from a thin, elongated opening to a U-shaped opening, but preferably is V-shaped so that ribbon R is given an initial shape slightly conforming to but requiring additional reforming to bring it into adhering contact with the marginal surfaces along edge E.

A blower system generally designated 25 is mounted to frame 12 at the next succeeding station, and comprises a manifold 26 fed by a conduit 27 from a suitable supply for directing a stream of gas downwardly against ribbon R to press it into frictional conformity around edge E. The positioning of manifold 26 with respect to extruder 14 is arbitrary, but for best results overlies the point where ribbon R emerging from orifice 24 first makes contact with edge E. This spacing should be as close to the extruder as possible to ensure that the ribbon is still semi-molten and tacky when contact is made; but, depending on conditions in the contact area, is preferably positioned to correspond with the intersection of the ribbon as it flows in a natural and unhindered inclined path toward edge E.

The flow of gas against ribbon R is critical, considering the thin and readily flowable nature of the semi-molten plastic, and must not be of such pressure as to cause poor and imperfect adherence to the edge E. Specifically, the object is to maintain a soft fluid pressure against the ribbon so that it progressively and completely conforms over edge E without voids, gaps or wrinkles, but yet is not caused to distort, prematurely contact, or otherwise be subjected to conditions which could result in rupture as it contacts the edge E. A ribbon of V-shaped cross section works well under these circumstances, one reason being that this configuration is capable of some degree of control as it conforms to the edge E and is less susceptible to the dynamic influence of the gas as it flows down and over the ribbon; e.g. surface pressure irregularity or differentials inherent in the patterns of gas flow tending to cause rippling or fluttering of the ribbon.

Manifold 26 may be of any suitable configuration, but preferably is constructed to produce the best possible current pattern in the contact area. A manifold having a single elongated orifice or jet 28 which transversely overlies and projects a solid curtain of gas across the width of ribbon R has been found to produce satisfactory results. The use of more than one jet in line above edge E is optional and may be desirable in some instances where conditions warrant.

Depending on conditions at the contact area which may necessitate the addition of heat to ensure that ribbon R is tacky at the time of engagement over edge E, means may be provided for heating the gas. This may be done at the source of supply, but in order to better control the temperature of the gas, an electrical heating element 29 may be disposed in a cavity 30 within the manifold and energized through leads 31, 31. These leads may be connected to any suitable power source, a convenient one being the circuit supplying the resistance heaters (not shown) ordinarily incorporated in extruder 14, and may include a rheostat 32 for regulating the temperature of the gas flowing through manifold 26.

The gas itself may be any inexpensive and expendable fluid capable of safe handling and neutral in its effect on the materials of ribbon R and web W. Air is a perfectly satisfactory gas for this purpose and is ordinarily in abundant supply under pressure in most manufacturing areas. For a completely unitary system, however, conduit 27 may be supplied by a simple centrifugal air pump 33. A valve 34 in conduit 27 serves as a convenient means for regulating the pressure and thereby the force of the air emitting from the manifold.

If desired, ribbon R may be drawn down to a thickness as it conforms to edge E less than its thickness when it first emerges from orifice 24. This may be accomplished in the well-known manner of maintaining the speed of web W in excess of that of the extruding ribbon prior to making contact with the web. It is for this purpose that pinch rolls 11, 11 controlling the feed of the web are maintained at a relative speed with respect to extruder 14 through pulleys 22 and 23 and belt 21 as hereinbefore suggested. Obviously, the speed of rolls 11, 11 and thus the rate of feed of web W may be regulated in any desired manner, such as by varying the size of pulleys or by incorporating suitable gearing (not shown) in the drive system.

The banded web W next passes between a pair of coacting pressure rolls 35, 35 for firmly bonding the now conforming ribbon R to marginal edge E. These pressure rolls may be placed at any convenient station along the path of travel, but sufficiently close to manifold 26 so that ribbon R still retains some tackiness as it is engaged by the rolls to ensure good adhesion to the web. A simple but by no means exclusive arrangement is to form rolls 35, 35 as integral, reduced-diameter portions of pinch rolls 11, 11 as shown, in which case the roll drives are common and the tangential speeds substantially similar. To prevent the hot, tacky ribbon R from adhering to rolls 35, 35 and to promote solidification, these rolls may be chilled internally by circulating water or other temperature controlled medium (not shown).

After leaving pressure rolls 35, 35 the banded web may then pass on to a winding roll for storage or to some subsequent forming or shaping operation (not shown).

It is thought that the invention and many of its attendant advantages will be understood from the foregoing description and it will be apparent that various changes may be made in the form, construction, and arrangement of the parts of the apparatus mentioned herein and in the steps and their order of accomplishment of the method described herein, without departing from the spirit and scope of the invention or sacrificing all of its material advantages, the apparatus and process hereinbefore described being merely a preferred embodiment thereof.

We claim:

1. A method of edge banding a flat article comprising the steps of feeding said article continuously along a linear path, passing a continuous ribbon of flexible, coherent, semi-molten plastic in the direction of feed and in an intersecting path toward a marginal edge of said article, applying fluid pressure softly against said ribbon and toward said edge to frictionally conform said ribbon to the opposite marginal surfaces along said edge, and applying additional pressure to said ribbon to firmly bond said ribbon to said marginal edge.

2. The method of claim 1 including the step of maintaining the rate of feed of said article in excess of the rate of feed of said ribbon to draw said ribbon into a thinned-out band in adhering conformity with said marginal edge.

3. The method of claim 1 wherein said ribbon is extruded in a substantially V-shaped cross section.

4. The method of claim 1 wherein said fluid pressure is accomplished through the medium of a heated gas to maintain said ribbon in a tacky state as it conforms to said marginal edge.

5. The method of claim 1 including the additional step of heating said marginal edge prior to bonding said ribbon thereto.

6. A method of applying an adhesive band to a longitudinal margin of a continuous planar strip comprising the steps of longitudinally feeding said strip at a predetermined speed in a linear path, extruding a continuous ribbon of semi-molten thermoplastic resin at a slower speed in the direction of feed and in an intersecting path toward said margin, maintaining a gentle stream of gas against said ribbon and toward said margin to softly wipe said ribbon progressively over the edge of said strip and into frictional conformity with said margin, said conforming ribbon being drawn thinner as it adheres to said margin by reason of the greater speed of said strip, and applying pressure to said ribbon on opposite sides of said strip to firmly bond said ribbon to said margin.

7. An apparatus for edge banding a flat article comprising means for feeding said article along a predetermined linear path, means for passing a continuous ribbon of flexible, coherent, semi-molten plastic in the direction of feed and in an intersecting path toward a marginal edge of said article, means along said path for applying fluid pressure softly against said ribbon and toward said edge to frictionally conform said ribbon to the opposite marginal surfaces along said edge, and contacting pressure means operative along said path to firmly bond said ribbon to said marginal edge.

8. The apparatus of claim 7 wherein said first two means are synchronized at relative rates of feed, the speed of said article being maintained in excess of the speed of said ribbon to draw said ribbon into a thinned-out band in adhering conformity with said marginal edge.

9. The apparatus of claim 7 wherein said second means comprises an extruder having a V-shaped nozzle for forming said ribbon to a like cross section.

10. The apparatus of claim 7 wherein said means for applying fluid pressure against said ribbon comprises a gas manifold having an elongated jet directed toward and extending transversely of said marginal edge, and including associated heating means operative to heat said gas to a temperature sufficient to maintain said ribbon in a tacky state as it conforms to said marginal edge.

11. The apparatus of claim 7 including additional means for heating said marginal edge prior to bonding said ribbon thereto.

12. An apparatus for applying an adhesive band to a longitudinal margin of a continuous planar strip comprising means for longitudinally feeding said strip at a predetermined speed in a linear path, an extruder disposed along said path for extruding a continuous ribbon of semi-molten thermoplastic resin at a slower speed in the direction of feed and in an intersecting path toward said margin, a gas manifold disposed along said linear path having a jet for directing a gentle current of gas against said ribbon and toward said margin to softly wipe said ribbon over the edge of said strip and into frictional conformity with said margin, said ribbon being drawn thinner as it adheres to said margin by reason of the greater speed of said strip, and coacting rolls operative along said path to firmly bond said ribbon to said margin.

References Cited by the Examiner

UNITED STATES PATENTS

| | | | |
|---|---|---|---|
| 2,291,670 | 8/1942 | Wiley et al. | 264—174 |
| 2,412,429 | 12/1946 | Slingluff et al. | |
| 2,575,138 | 11/1951 | Slaughter | 18—59 |
| 2,751,629 | 6/1956 | Dick | 18—59 |
| 2,821,155 | 1/1958 | Seckel | 18—59 |
| 3,066,063 | 11/1962 | Ecklund et al. | 156—200 |
| 3,138,513 | 6/1964 | Duncanson et al. | 156—497 |

ROBERT F. WHITE, *Primary Examiner.*

ALEXANDER H. BRODMERKEL, *Examiner.*